United States Patent
Hebenstreit et al.

(10) Patent No.: US 8,345,073 B1
(45) Date of Patent: Jan. 1, 2013

(54) TOUCH SCREEN LAYER REDUCTION

(75) Inventors: Joseph J. Hebenstreit, San Francisco, CA (US); David C. Buuck, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 464 days.

(21) Appl. No.: 12/730,653

(22) Filed: Mar. 24, 2010

(51) Int. Cl.
*G06F 3/041* (2006.01)
(52) U.S. Cl. ........................ 345/901; 345/173
(58) Field of Classification Search .................. 345/173, 345/174, 901
See application file for complete search history.

(56) References Cited

U.S. PATENT DOCUMENTS

| | | | |
|---|---|---|---|
| 6,369,793 B1 * | 4/2002 | Parker | 345/107 |
| 7,864,151 B1 * | 1/2011 | Yamazaki et al. | 345/97 |
| 2008/0192013 A1 * | 8/2008 | Barrus et al. | 345/173 |
| 2010/0164888 A1 * | 7/2010 | Okumura et al. | 345/173 |

\* cited by examiner

*Primary Examiner* — Kevin M Nguyen
*Assistant Examiner* — Sepideh Ghafari
(74) *Attorney, Agent, or Firm* — Lee & Hayes, PLLC

(57) ABSTRACT

Layers of a touch sensor array used by electronic devices may be incorporated into other components, such that a touch sensor array is formed upon assembly of the other components. This touch sensor array may then be used as an input device by a user. For example, one layer of a touch sensor array may be integrated into the back of a display component, forming a first integrated package. Similarly, a second layer of the touch sensor array may be integrated into the front of a battery, forming a second integrated package. Upon assembly of the display atop the battery, the touch sensor array is formed. Such integration results in simpler and less expensive assembly, reduces the count of discrete parts during assembly, and minimizes the electronic device's physical profile.

27 Claims, 8 Drawing Sheets

TOUCH SCREEN LAYER REDUCTION

BACKGROUND

Users increasingly demand devices with additional capabilities, such as touch-sensitive input devices, in ever smaller and smaller form factors (that is, an overall size of the device). Traditionally, adding touch-sensitive input devices to an electronic device has complicated the manufacture and assembly of the device, as well as undesirably increase the overall thickness of the device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Electronic devices such as cellular phones, portable media players, tablet computers, netbooks, laptops, electronic book ("eBook") readers, and so forth, increasingly incorporate touch-sensors as input devices to enable users to control and otherwise interact with the devices. However, traditional incorporation of sensors in the electronic device increases the bulk, complexity, manufacturing costs, and so forth.

This disclosure describes, in part, devices that include a touch screen having a reduced number of layers compared to traditional devices and techniques for assembling such touch-screen devices. A touch sensor may contain two or more layers. When properly positioned, these two or more layers form a crosspoint array. These layers are incorporated into one or more integrated packages containing other components. The touch-sensitive crosspoint array is formed when the portion of the device containing the one or more components with incorporated layers is assembled. By positioning the touch sensor above or below a display, a touch screen is formed.

Crosspoint arrays may include capacitive arrays, digital resistive arrays, interpolating force sensitive resistor ("IFSR") arrays, and so forth which may be used as the touch sensor. A crosspoint array, such as implemented in an IFSR array, comprises at least two layers, each layer having a series of approximately parallel conductive traces or wires. These traces or wires may be printed, deposited, etched, embedded, or otherwise placed onto a substrate. In some implementations, the two layers are arranged such that the orientation of wires in a first layer is substantially perpendicular to the orientation of wires in a second layer. Upon application of an incident force to the layers, resistance to electrical current at and around the point of force application changes. By scanning the wires and measuring these changes in resistance at junctions of the wires, a location and magnitude of force applied may be determined.

Among the implementations described below, the first layer of a crosspoint array may be integrated into the back of a display device, while the second layer of the crosspoint array may be integrated into the front of a battery pack. Upon placing the display on the battery pack during assembly, the crosspoint array is formed. Thus, no additional step is required for placement of a dedicated crosspoint array component, which simplifies assembly. Furthermore, this removes any packaging or material which would be required for handling or to act as a substrate which would otherwise be present in a dedicated crosspoint array, resulting in a slimmer profile. Thus, as described herein, a crosspoint array may be assembled without layers previously required.

Illustrative Touch-Screen Device

Figure 1:
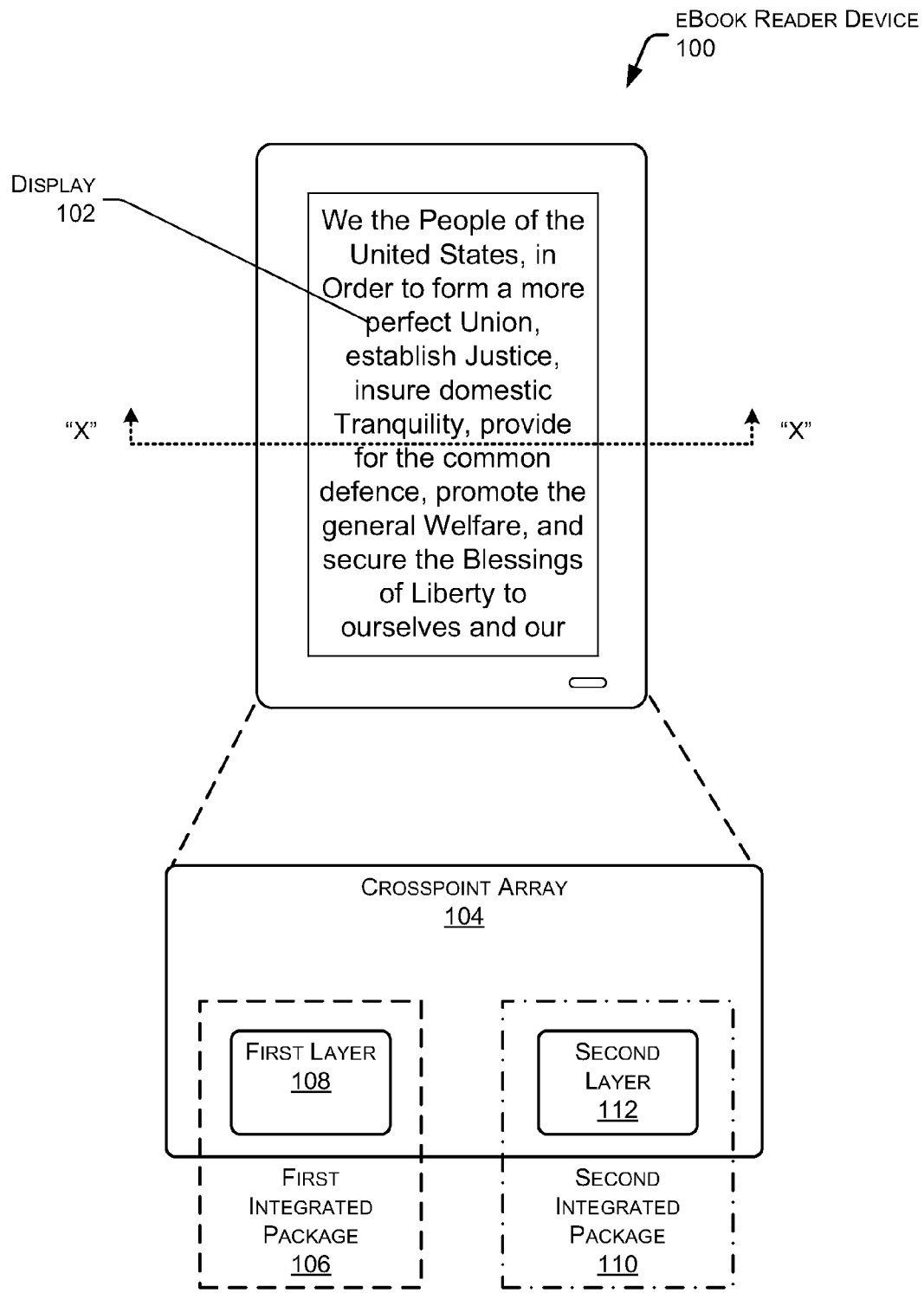
FIG. 1 depicts an illustrative electronic book ("eBook") reader device having a touch sensor comprising a crosspoint array formed by two integrated packages.

FIG. 1 depicts an illustrative electronic device implementing touch-screen functionality, such as an eBook reader device 100. While an eBook reader device 100 is illustrated, other electronic devices may be configured to form a touch-sensitive array from assembly of one or more integrated packages. These other devices include cellular phones, portable media players, tablet computers, netbooks, laptops, and so forth. While a touch sensor comprising a crosspoint array is shown, other technologies such a capacitive touch sensor may be used.

Furthermore, in some implementations integrated packages may be used to form other active components. For example, the first layer and second layers may, when combined, form a display device, memory device, photovoltaic array, light emitting diode array, and so forth.

FIG. 1 depicts that eBook reader device 100 includes a display 102, described in more depth below with regards to FIG. 2. Approximately perpendicular to the long axis of the display is cross sectional line "X." As illustrated, eBook reader device 100 includes an active component such as crosspoint array 104. In one implementation, the crosspoint array 104 is established upon coupling of a first integrated package 106 that includes a first layer 108 to a second integrated package 110 that includes a second layer 112. When formed into the crosspoint array 104, the wires within the first layer 108 are generally perpendicular to the wires within the second layer 112, although they may reside at any other angle relative to one another in other implementations. Coupling may include placement of the first integrated package 106 proximate to the second integrated package 110, such that the first layer 108 and second layer 112 are at least partially in contact with one another.

Figure 2:
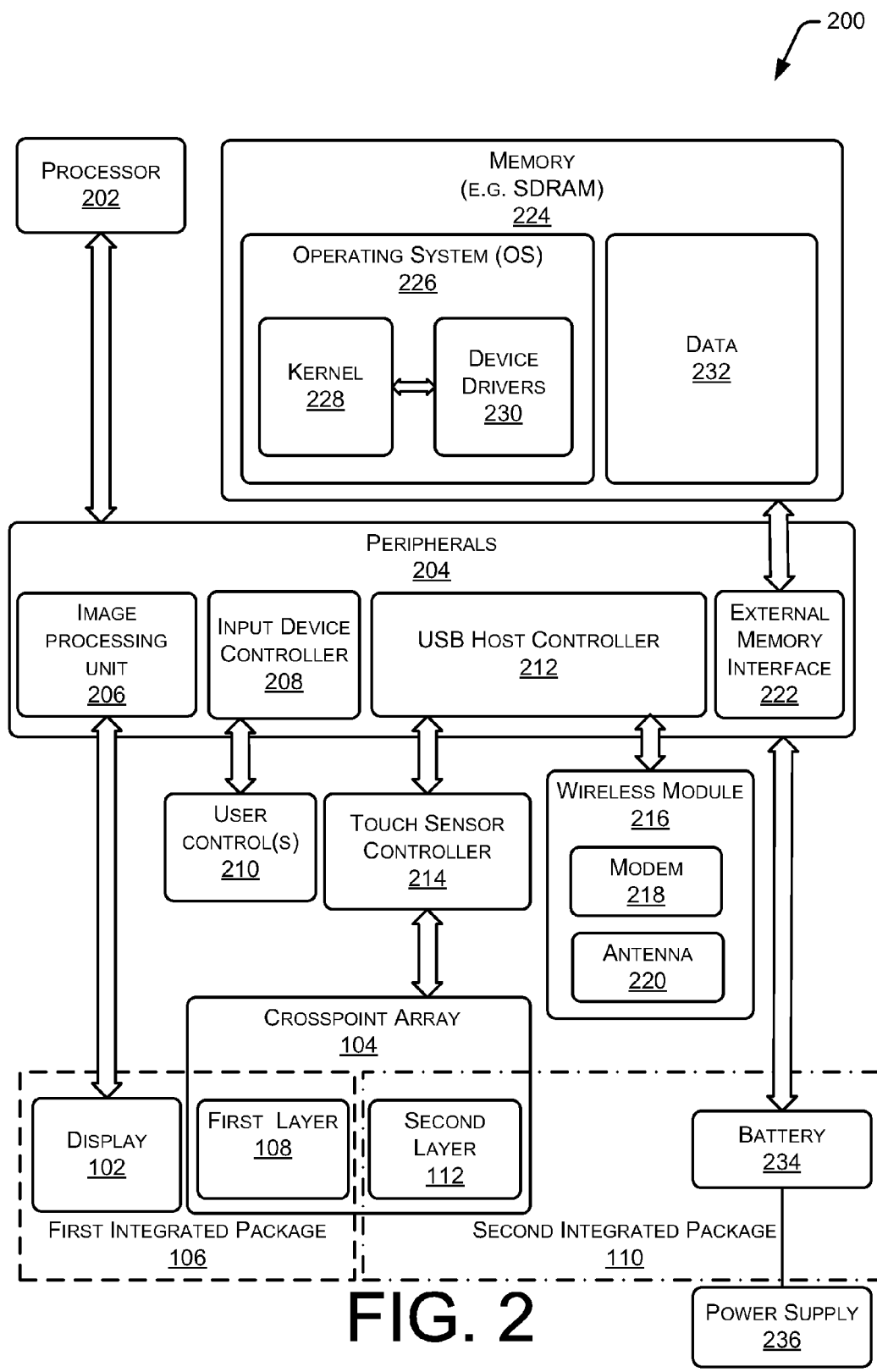
FIG. 2 is an illustrative schematic of an electronic device showing an example distribution of components across the integrated packages.

FIG. 2 is an illustrative schematic 200 of an electronic device, such as an eBook reader device 100, showing the crosspoint array 104 and distribution of layers across two integrated packages. In a very basic configuration, the device 100 includes components such as a processor 202 and one or more peripherals 204. Each processor 202 may itself comprise one or more processors.

Peripherals 204 couple to the processor 202. An image processing unit 206 is shown coupled to one or more display components 102 (or "displays"). In some implementations, multiple displays may be present and coupled to the image processing unit 206. These multiple displays may be located in the same or different enclosures or panels. Furthermore, one or more image processing units 206 may couple to the multiple displays.

Display 102 may present content in a human-readable format to a user. The display 102 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 102 may take the form of electronic books or "eBooks." For example, the display 102 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 100 further includes a touch sensitive input device. In one implementation, the crosspoint array 104 may be placed behind the display, such that user input through contact or gesturing relative to the display 102 may be received. In other implementations, the touch sensor may be placed in front of the display 102, or in another part of the device altogether. For convenience only, the display 102 is shown in a generally rectangular configuration. However, it is understood that the display 102 may be implemented in any shape, and may have any ratio of height to width. Also, for stylistic or design purposes, the display 102 may be curved or otherwise non-linearly shaped. Furthermore the display 102 may be flexible and configured to fold or roll.

EBook reader device 100 may have an input device controller 208 configured to accept input from the touch sensor, keypad, keyboard, or other user actuable controls 210. These user actuable controls 210 may have dedicated or assigned operations. For instance, the actuatable controls 112 may include page turning buttons, a joystick, navigational keys, a power on/off button, selection keys, joystick, touchpad, and so on.

A USB host controller 212 may also be located on the main logic board 202. The USB host controller 212 manages communications between devices attached to a universal serial bus ("USB") and the processor 202 and other peripherals.

FIG. 2 further illustrates that eBook reader device 100 includes a touch sensor controller 214. The touch sensor controller 214 may be coupled to the processor 202 via an interconnect to the USB host controller 212 (as shown). In other implementations the touch sensor controller 214 may couple to the processor via the input device control 208, inter-integrated circuit ("I²C"), universal asynchronous receiver/transmitter ("UART"), or serial peripheral interface bus ("SPI"), or other interface. The touch sensor controller 214 is also coupled to the first layer 108 and second layer 112. Interconnects include an electrical conductor, an optical path, electromagnetic waveguides, fluidic channels, magnetic couplings, mechanical couplings, wireless signal, and so forth. In some implementations, interconnects may be integral to components. Interconnects may be rigid, flexible, elastomeric, and so forth.

The touch sensor controller 214 is configured to use the crosspoint array 104 to determine characteristics of interaction with the touch sensor. These characteristics may include the location of the touch on the crosspoint array 104, magnitude of the force, shape of the touch, and so forth.

The USB host controller 212 may also be coupled to a wireless module 216 via the universal serial bus. Wireless module 216 may allow for connection to wireless local or wireless wide area networks ("WWAN"). Wireless module 216 may include a modem 218 configured to send and receive data wirelessly and one or more antennas 220 suitable for propagating a wireless signal. In other implementations, a wired network interface may be provided.

EBook reader device 100 may also include an external memory interface ("EMI") 222 coupled to external memory 224. The EMI 222 manages access to data stored in external memory 224. The external memory 224 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

External memory 224 may store an operating system 226 comprising a kernel 228 operatively coupled to one or more device drivers 230. Device drivers 230 are also operatively coupled to peripherals 204. External memory 224 may also store data 232, which may comprise content objects for consumption on eBook reader device 100, executable programs, databases, user settings, configuration files, device status, and so forth.

Furthermore, eBook reader device 100 may include one or more other, non-illustrated peripherals, such as a hard drive using magnetic, optical, or solid state storage to store information, a firewire bus, a Bluetooth™ wireless network interface, camera, global positioning system, PC Card component, and so forth.

One or more batteries 234 provide operational electrical power to components of the eBook reader device 100 for operation when the device is disconnected from a power supply 236. Operational electrical power is sufficient to provide for operation of the device, as distinguished from the lesser electrical power requirements of a sleep or state retention mode. Power supply 236 may be internal or external to the eBook reader device 100. Power supply 236 is configured to provide operational power for eBook reader device 100, charge battery 234, or both. "Battery" as used in this application includes components capable of acting as a power source to an electronic device. Power sources include chemical storage cells such as lithium polymer batteries, charge storage devices such as ultracapacitors, fuel cells, and so forth.

Couplings, such as that between input device controller 208 and user controls 210, are shown for emphasis. There are couplings between many of the components illustrated in FIG. 2, but graphical arrows are omitted for clarity of illustration.

Figure 3A:
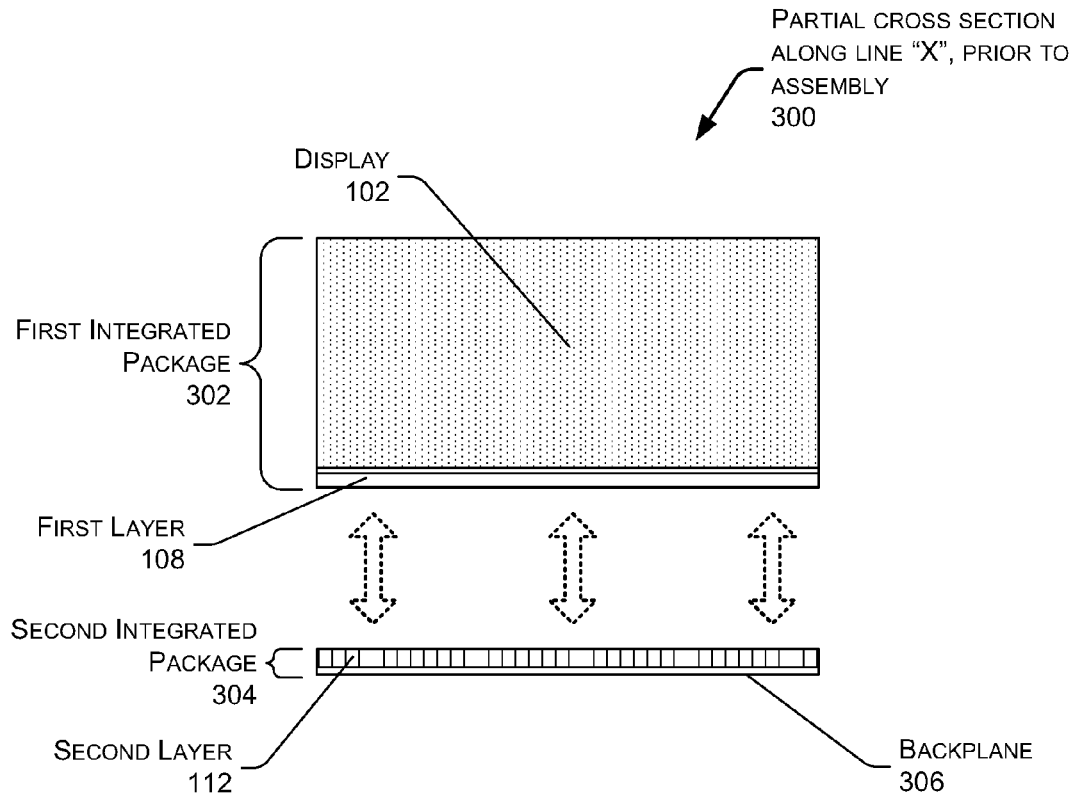
FIGS. 3A and 3B illustrate cross sections of a first implementation of a device having two integrated packages combined to form the crosspoint array.
Figure 3B:
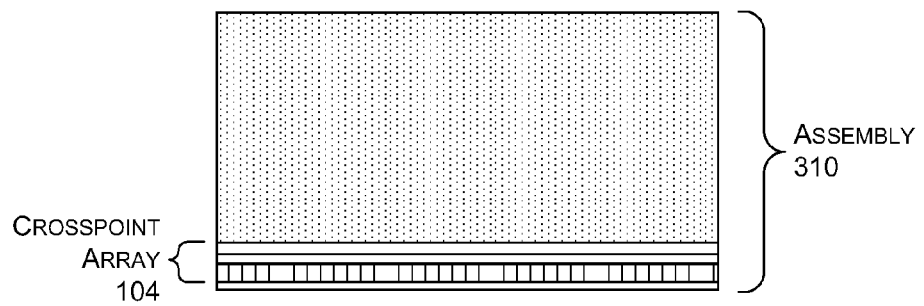

FIGS. 3A and 3B illustrate one implementation of the eBook reader device 100. In FIG. 3A, a cross section 300 of a portion of the device prior to assembly and along line "X" is shown. A first integrated package 302 includes the display 102 and the first layer 108. A second integrated package 304 includes the second layer 112 and a backplane 306. The backplane 306 may be a conductive surface providing a ground plane, a circuit board, and so forth.

As shown here, a layer for an active component such as a crosspoint layer may be deposited onto, etched into, integral with, or bonded to a host component. The host component provides a framework, matrix, or substrate for the layer. Thus, a host component provides functionality or structure to the device in addition to acting as a substrate for a layer of the active component. In some implementations, the host component itself may be active, in that it produces, consumes, or stores electrical power. The host component may also form a part of the shell, enclosure, or protective covering of the device. For example, a transparent protective cover over the display 102 may also serve as a host component for a layer.

By using the host component to provide at least a portion of the structure of the layer, complexity, thickness, and parts count during assembly are reduced. Thus, it is possible to omit portions of the structure which have previously been required. For example, in some implementations the layers may be printed, deposited, etched, or embedded directly onto or into host components, thus removing the need for a separate substrate during manufacture of each of the layers. Host components include a backplane 306, circuit board, display 102, battery 234, exterior case, component shell, interior structural partition, and so forth.

FIG. 3B illustrates an assembled cross section 308. Here, the first integrated package 302 has been combined with the second integrated package 304. The assembled placement of the first layer 108 proximate to the second layer 112 thus forms the crosspoint array 104. In the implementation depicted here, the first and second layers are present without a separate backing or substrate. Instead, the first 108 and second 112 layers have been deposited directly upon their host components, the display 102 and backplane 306, respectively.

As described above, when the first and second layers are proximate to one another, a pressure applied to the proximate layers will vary resistance to an electrical signal. This variance in resistance combined with a scan of the wires within the layers results in a machine-readable signal indicating magnitude and location of the applied force. Upon assembly 310, the layers form a crosspoint array 104, which in combination with the host component display 102, and upon coupling to the touch sensor controller 214, image processing unit 206, and other components, forms a touch-sensitive display. In contrast to traditional designs, substrates or backings on the layers have been omitted, thus resulting in a device having a relatively thinner profile or depth.

Figure 4A:
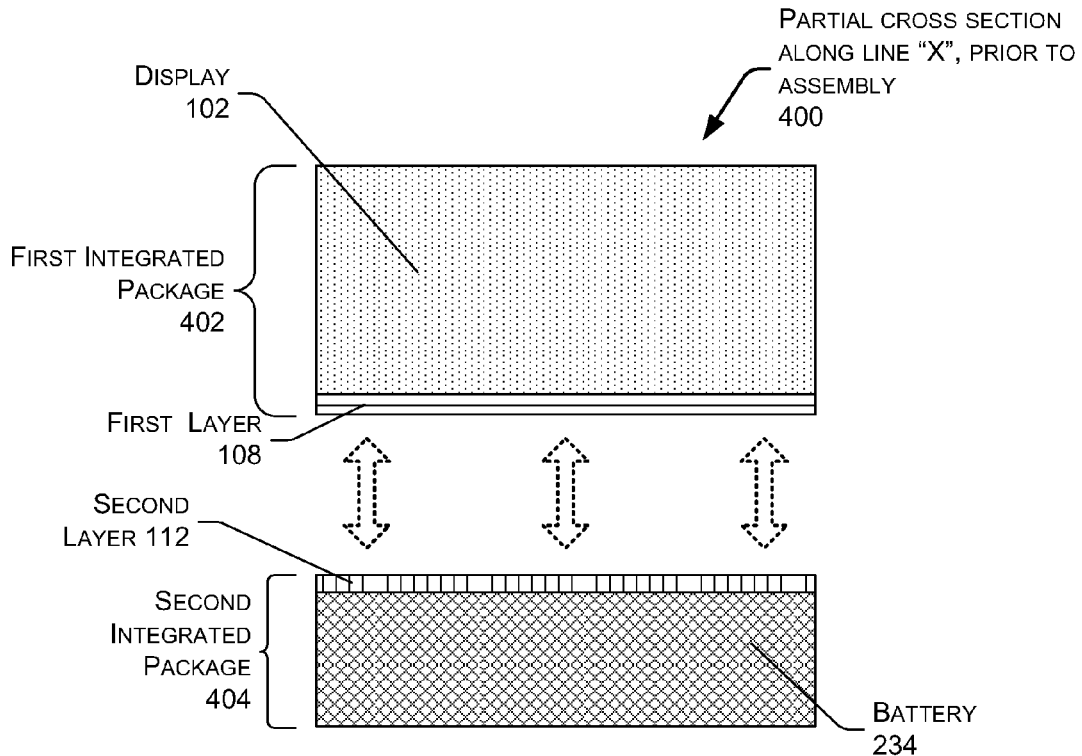
FIGS. 4A and 4B illustrate cross sections of a second implementation of a device having two integrated packages combined to form the crosspoint array.
Figure 4B:
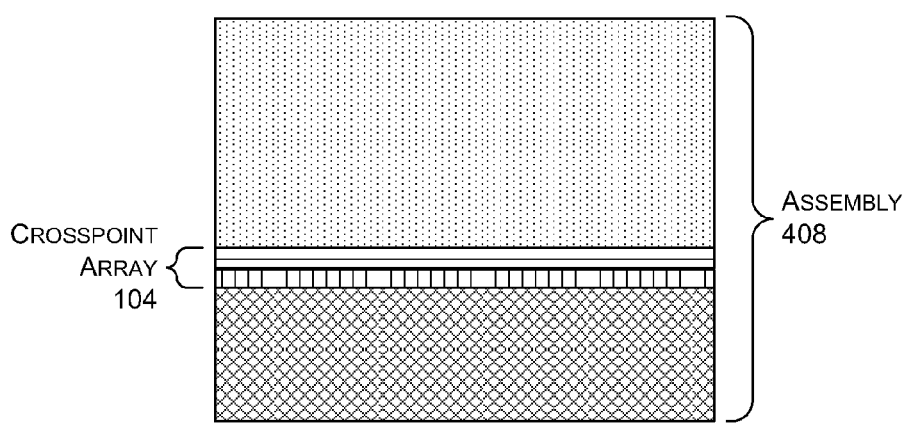

FIGS. 4A and 4B illustrate another implementation of the eBook reader device 100. FIG. 4A shows a cross section 400 of a portion of the device prior to assembly and along line "X". In this implementation, a first integrated package 402 comprises the display 102 and the first layer 108. A second integrated package 404 comprises the second layer 112 and the battery 234.

Host components in this figure include the display 102 and the battery 234. As described above, the first layer 108, the second layer 112, or both may be integral to a host component. For example, as shown here the first layer 108 is deposited onto a back surface of display 102.

In other implementations, one or more layers of the crosspoint array 104 may be bonded to the host component. This bonding may include mechanical fixation, adhesive, lamination, and so forth. For example, the second layer 112 having a carrier or substrate may be bonded to the battery 234 during fabrication. This may be fabrication of the battery 234, of a sub-assembly including the battery 234, or of the entire eBook reader device 100. Likewise, the first layer 108 may be bonded to the display 102 during fabrication of the screen.

By integrating or bonding layers of the crosspoint array 104 to host components, the overall manufacturing process may be simplified. For example, during final assembly of the device, or at least a sub-assembly containing the layers, formation of the crosspoint array 104 is accomplished by placing the first integrated package 402 atop the second integrated package 404. Without the techniques described herein, it would be necessary to insert one or more components such as two separate layers, each on a substrate, prior to assembly to form the crosspoint array 104.

Some crosspoint arrays may call for more than two layers. In such implementations, additional layers may be inserted between the first integrated package 402 and second integrated package 404.

In FIG. 4B, upon assembly 406 of the first integrated package 402 and the second integrated package 404, the crosspoint array 104 is formed. A resulting assembly 408 thus includes the crosspoint array 104, the display 102, and the battery 234.

In addition to simpler assembly, another advantage of these techniques is that a slimmer physical profile of the device may also be achieved. By using the host components as a substrate, backing material for the layers may be reduced or omitted. For example, where the crosspoint array 104 is a separate entity for installation, it may have a thicker substrate for handling the part during assembly. Use of a host component allows for the removal or reduction of this separate substrate. By removing or reducing the need for a separate substrate in the crosspoint array 104, the overall completed assembly 408 is thinner.

Multiple crosspoint arrays or other active components may be formed within the same eBook reader device 100. Furthermore, a component may act as a host component for several devices. For example, in addition to the crosspoint array 104 shown here, the battery 234 may also act as a host component for a first layer of a photovoltaic array deposited on the underside of the battery 234 while a portion of a device enclosure acts as a second layer of the photovoltaic array.

Figure 5A:
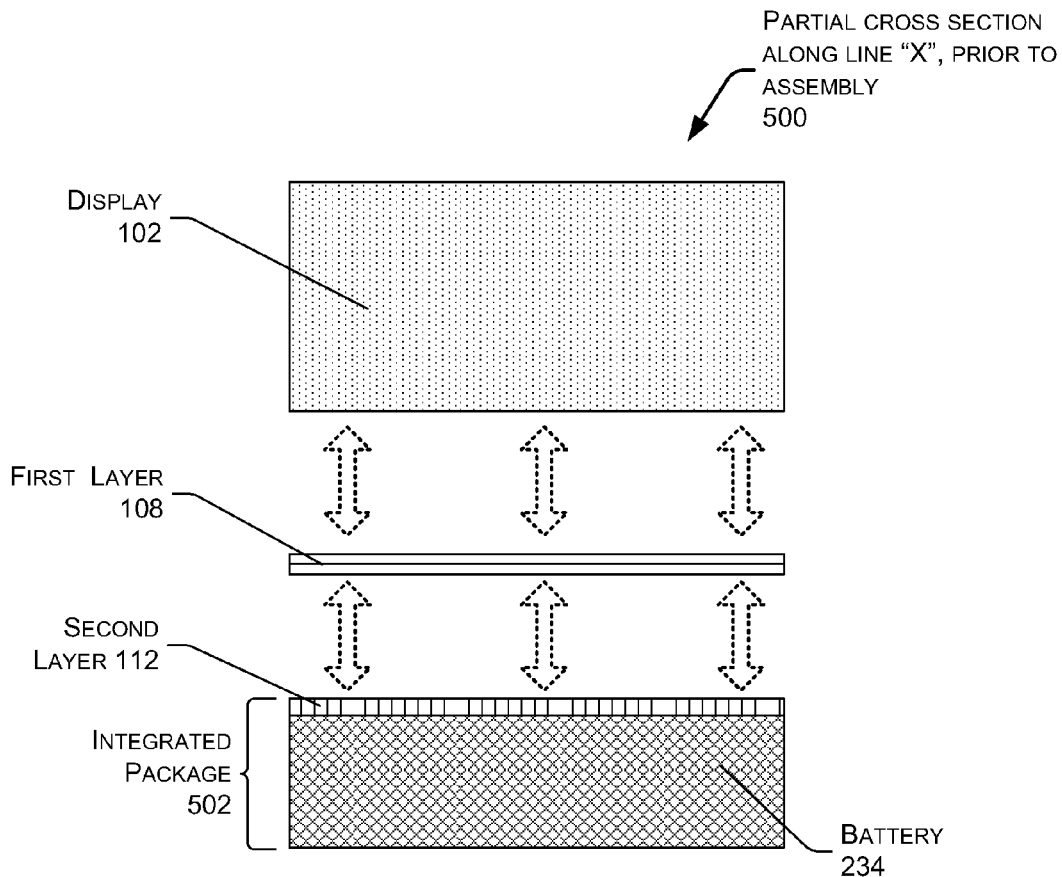
FIGS. 5A and 5B illustrate cross sections of a third implementation of a device comprising an integrated package combined to form the crosspoint array.
Figure 5B:
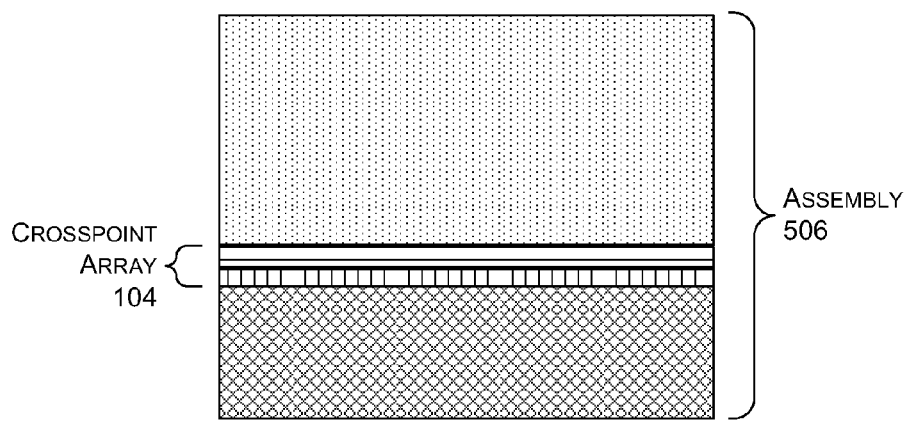

FIGS. 5A and 5B illustrate another implementation of an eBook reader device 100. FIG. 5A shows a cross section 500 of a portion of the device prior to the assembly along line "X". In this implementation, the display 102 is positioned above the first layer 108, which is in turn positioned above an integrated package 502. The integrated package 502 includes the second IFRS layer 112 and the battery 234.

In some implementations, it may be advantageous to refrain from involving the display 102 in additional manufacturing steps. For example, application of the first layer 108 to the display 102, as described above with respect to FIGS. 4A and 4B, may result in increased probability of unacceptable damage to the display 102, increasing yield fallout. Given that display components are typically costly relative to other components of the eBook reader device 100 or any other electronic device, a manufacturer may seek to avoid undue damage of the display components.

Therefore, in some situations, a single integrated package 502 may be used. As shown here, the integrated package 502 incorporates the (comparatively) less expensive battery 234 in conjunction with the second layer 112. During assembly only a single layer 108 is inserted.

When assembled as shown at 504, the first layer 108 and the second layer 112 thus form the crosspoint array 104. Thus, assembly 506 includes the crosspoint array 104, the display 102 and the battery 234.

Figure 6A:
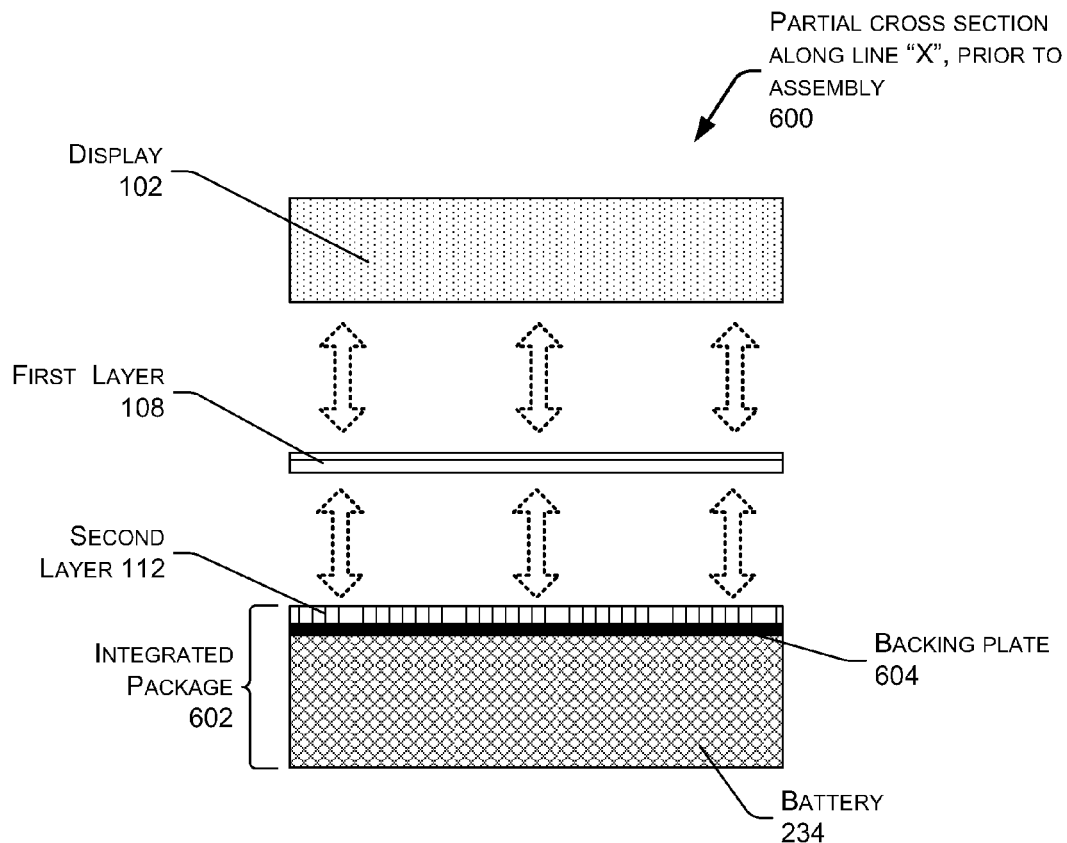
FIGS. 6A and 6B illustrate cross sections of another implementation of a device using a single integrated package to form the crosspoint array.
Figure 6B:
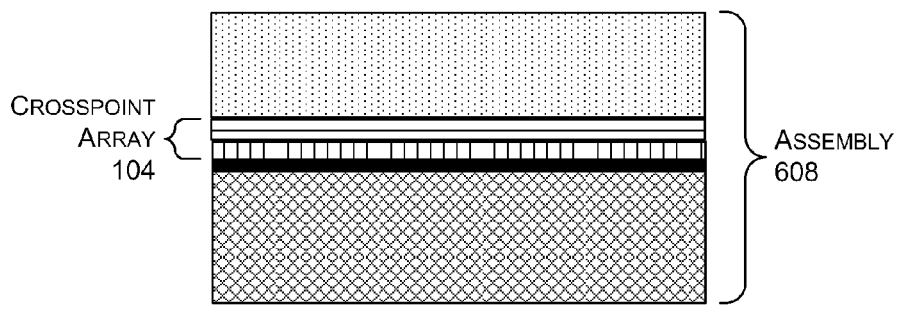

FIGS. 6A and 6B illustrate another implementation of an eBook reader device 100. FIG. 6A shows a cross section 600 of a portion of the device prior to assembly along line "X". In this implementation, the display 102, first layer 108, and an integrated package 602 are shown. As shown in this illustration, battery 234 acts as the host component to the second layer 112 in the integrated package 602. The integrated package 602 of this implementation includes the second layer 112, a backing plate 604, and the battery 234. Installation of the backing plate 604 reduces point pressure on the battery 234, smoothes out an otherwise irregular battery surface, and so forth.

Backing plate 604 may be constructed of a material which is rigid, semi-rigid, elastomeric, deformable, and so forth. Selection of material depends upon the desired result. For example, where it is desirable to distribute force across a larger area of a host component, a rigid or semi-rigid material may be used as the backing plate 604. In another example, where a relatively flat surface is desired, a deformable material may be used to even out variations in the surface of the host component. The backing plate may be relatively uniform in thickness, or may be contoured to match variations in thickness of the underlying host component.

In FIG. 6B, the assembled 606 components are shown. Here, assembly 608 includes the display 102, the crosspoint array 104 formed by the assembly, the backing plate 604, and the battery 234. When a force is applied to the crosspoint array 104, the backing plate 604 may distribute pressure across a larger area of battery 234.

While the crosspoint array 104 is shown above on the back side the display 102, in some implementations the crosspoint array 104 may be placed on the surface of the display 102. In such an implementation, the host component for the first layer 108 may be the exterior cover or surface over the display 102. The host component for the second layer 112 may then be the display 102, or more specifically, the surface of the display 102. In such an implementation, the wires of the crosspoint array 104 may be arranged approximately over inter-pixel dead spaces, to reduce interference with the image generated by display 102.

Figure 7A:
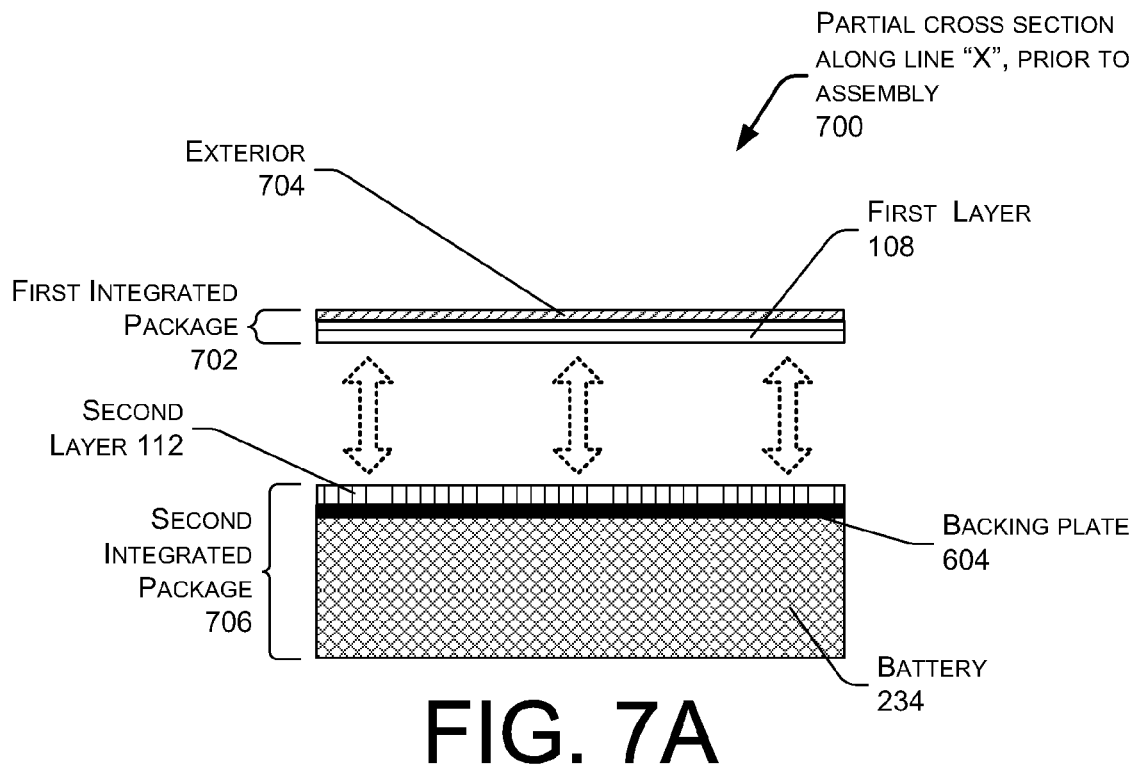
FIGS. 7A and 7B illustrate cross sections of an implementation of a device using two integrated packages to form the crosspoint array with a non-display surface.
Figure 7B:
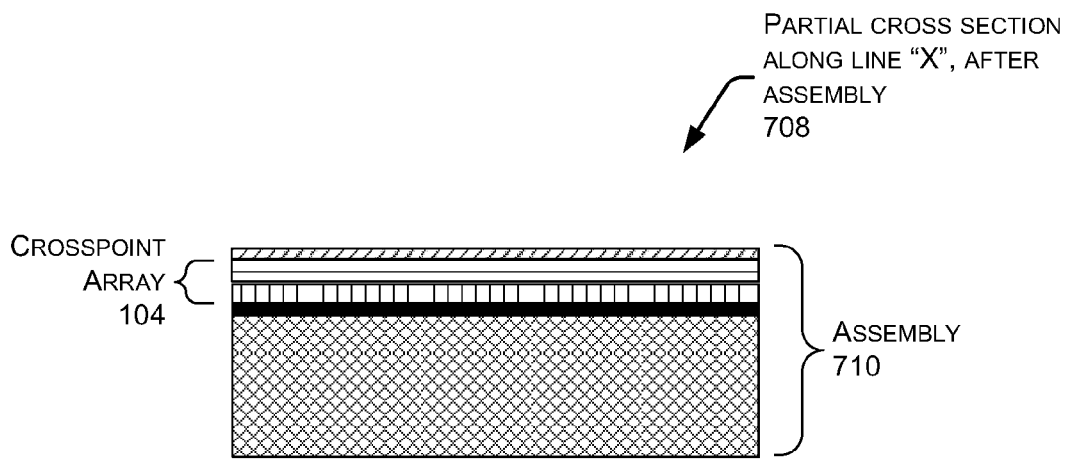

FIGS. 7A and 7B show an implementation of an eBook reader device 100, for a portion where no display is present. For example, the display may be located in a different portion of the eBook reader device 100, in another device, and so forth. FIG. 7A shows a cross section 700 of a portion of the device along line "X." In this illustration, a first integrated package 702 includes an exterior 704 and the first layer 108. Exterior 704 may be a pre-existing structure of one or more parts, or an encapsulating material, for example, a plastic or epoxy within which the first layer 108 is emplaced. A second integrated package 706 contains the second layer 112, the backing plate 604, and the battery 234.

In FIG. 7B, after assembly 708, the first integrated package 702 and the second integrated package 706 have been combined to form assembly 710. Assembly 710 thus includes the crosspoint array 104 formed as a result of the assembly.

Illustrative Process for Assembling a Reduced Height Device

Figure 8:
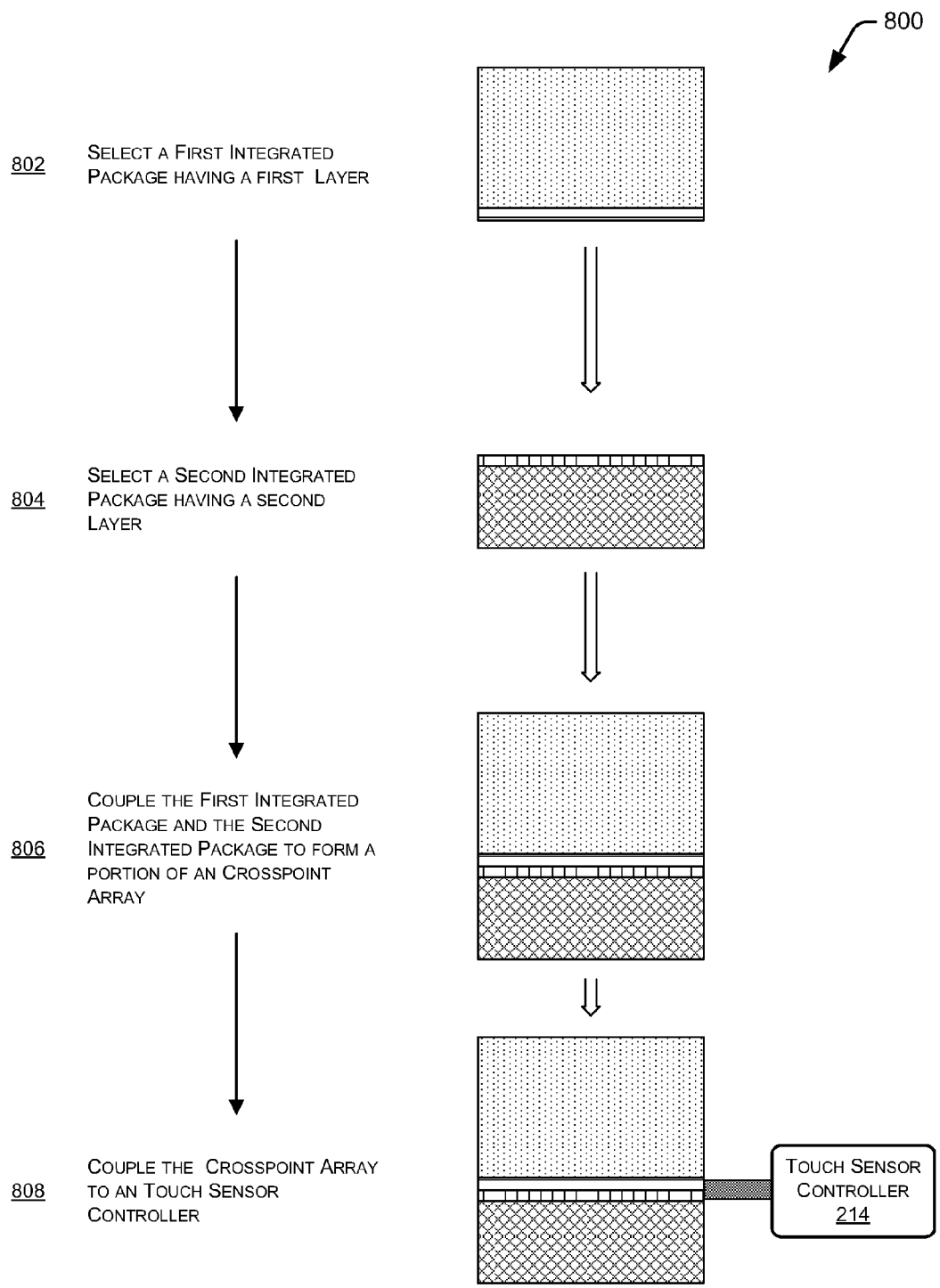
FIG. 8 is an illustrative process of assembling a crosspoint array from two integrated packages.

FIG. 8 illustrates an example process 800 that may be implemented by the architecture of FIGS. 1-7 or by other architectures. This process is illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 8 is an illustrative process 800 of assembling a touch sensor from an integrated package. Operation 802 selects a first integrated package having a first layer. For example, a display 102 may have a first layer 108 bonded to it. Packages may be selected manually, using a pick-and-place device or other automated equipment, or a combination of both.

Operation 804 selects a second integrated package having a second layer 112. Operation 806 couples the first integrated package and the second integrated package to form, at least in part, a crosspoint array 104. Coupling may be accomplished via soldering, mechanical insertion, physical contact, adhesion, and so forth. Operation 808 couples the crosspoint array 104 to a touch sensor controller 214 via an interconnect.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. An electronic book (eBook) reader device comprising:
   a processor;
   a memory coupled to the processor;
   a display coupled to the processor to render content on the eBook reader device;
   a battery coupled to the processor and the memory and disposed behind and proximate to the display, the battery configured to provide operational power to the display to render the content on the eBook reader device; and
   a touch sensor integral with the display and the battery and comprising:
      a first touch sensor layer integral with the display and disposed between the display and the battery, the first touch sensor layer being free from a substrate other than the display; and
      a second touch sensor layer integral with the battery and disposed between the battery and the display, the second touch sensor layer being free from a substrate other than the battery.

2. The device of claim 1, wherein the first touch sensor layer is deposited directly onto the display.

3. The device of claim 1, wherein the second touch sensor layer is deposited directly onto the battery.

4. The device of claim 1, further comprising a touch sensor controller configured to interrogate the touch sensor, determine a location of a force applied to the touch sensor, and output the determined location to the processor.

5. The device of claim 4, wherein the touch sensor controller couples to the touch sensor via an electrical conductor, an optical path, or an electromagnetic waveguide.

6. The device of claim 1, wherein the touch sensor comprises a crosspoint array.

7. The device of claim 1, wherein the display comprises an electrophoretic display.

8. A device comprising:
a touch sensor controller configured to identify a location of a touch applied to a touch sensor of the device;
a touch sensor coupled to the touch sensor controller, the touch sensor comprising:
an integrated package comprising a first touch sensor layer integral with a host component of the device, the first touch sensor layer being free from a substrate other than the host component of the device; and
a second touch sensor layer, the second touch sensor layer arranged such that the first touch sensor layer and the second touch sensor layer are proximate to one another.

9. The device of claim 8, wherein the first touch sensor layer is deposited directly upon or within the host component and the second touch sensor layer is deposited upon a substrate distinct from a component of the device.

10. The device of claim 8, wherein the first touch sensor layer comprises a set of approximately parallel conductors and the second touch sensor layer comprises a set of approximately parallel conductors, and wherein the first touch sensor layer is proximate to the second touch sensor layer such that the set of conductors in the first touch sensor layer resides approximately perpendicular to the set of conductors in the second touch sensor layer.

11. The device of claim 8, wherein the device embodies a portable eBook reader device.

12. The device of claim 8, wherein the second touch sensor layer is deposited directly upon a backing plate.

13. The device of claim 8, wherein the host component comprises a display of the device.

14. The device of claim 13, wherein the second touch sensor layer is disposed behind the display of the device.

15. The device of claim 8, wherein the host component with which the first touch sensor layer is integral comprises a first host component and the integrated package comprises a first integrated package, and wherein the second touch sensor layer is integral with a second host component of the device, the second touch sensor layer being free from a substrate other than the second host component of the device to form a second integrated package.

16. The device of claim 15, wherein the first component comprises a display and the second host component comprises a substantially transparent protective layer disposed over the display.

17. The device of claim 15, wherein the second host component comprises a battery of the device.

18. The device of claim 15, wherein a shell encompassing at least a portion of the second host component acts as a backing plate to at least partially disperse a mechanical force applied to the touch sensor during usage of the touch sensor.

19. The device of claim 15, wherein the first host component comprises a display of the device and the second host component is disposed behind the display.

20. The device of claim 19, wherein the display comprises a display capable of operating in a reflective mode.

21. A method of assembling a touch sensor array of a device, the method comprising:
selecting a first integrated package having a first touch sensor layer integral with a first host component of the device, the first touch sensor layer being free from a substrate other than the first host component;
selecting a second integrated package having a second touch sensor layer integral with a second host component of the device, the second touch sensor layer being free from a substrate other than the second host component; and
coupling the first integrated package with the second integrated package such that the first touch sensor layer and second touch sensor layers are proximate to one another and form, at least in part, the touch sensor array of the device.

22. The method of claim 21, wherein each of the first and second host components produce, consume, or store electrical power and provide respective functionality to the device in addition to acting as substrates for the touch sensor layers.

23. A method of assembling a touch sensor array of an electronic device, the method comprising:
selecting a first layer of the touch sensor, the first layer deposited or formed upon a substrate;
selecting an integrated package consisting of a host component of the electronic device with an integral second layer of the touch sensor, the second layer being free from a substrate other than the host component; and
coupling the first layer of the touch sensor to the integrated package to form, at least in part, the touch sensor array of the electronic device.

24. The method of claim 23, wherein the host component produces, consumes, or stores electrical power in addition to acting as a substrate for the second layer of the touch sensor.

25. The method of claim 23, wherein the substrate upon which the first layer of the touch sensor comprises a second host component.

26. A multilayer device comprising:
a first integrated package comprising a first layer of an active component, the first layer being integral with a first host component of the multilayer device and free from a substrate other than the first host component of the multilayer device; and
a second integrated package comprising a second layer of the active component, the second layer being integral with a second host component of the multilayer device and free from a substrate other than the second host component of the multilayer device, wherein the first and second integrated packages are arranged such that the first layer and the second layer are proximate to one another upon assembly.

27. The device of claim 26, wherein the active component comprises a display, a light emitting diode, or a photovoltaic cell.

* * * * *